(12) United States Patent
Mitsuo et al.

(10) Patent No.: US 9,610,866 B2
(45) Date of Patent: Apr. 4, 2017

(54) VEHICLE CHILD SAFETY SEAT AND HARNESS COVER

(71) Applicants: Tetsu Mitsuo, Nissin (JP); Yukihiro Yukita, Tajimi (JP); Osamu Nakagawa, Hikone (JP); Masayuki Sakumoto, Higashiomi (JP)

(72) Inventors: Tetsu Mitsuo, Nissin (JP); Yukihiro Yukita, Tajimi (JP); Osamu Nakagawa, Hikone (JP); Masayuki Sakumoto, Higashiomi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/648,118

(22) PCT Filed: Nov. 27, 2013

(86) PCT No.: PCT/IB2013/002648
§ 371 (c)(1),
(2) Date: May 28, 2015

(87) PCT Pub. No.: WO2014/083408
PCT Pub. Date: Jun. 5, 2014

(65) Prior Publication Data
US 2015/0314711 A1 Nov. 5, 2015

(30) Foreign Application Priority Data
Nov. 29, 2012 (JP) .................................. 2012-261491

(51) Int. Cl.
*B60R 22/02* (2006.01)
*B60N 2/26* (2006.01)
(Continued)

(52) U.S. Cl.
CPC ............... *B60N 2/265* (2013.01); *B60N 2/28* (2013.01); *B60N 2/2812* (2013.01);
(Continued)

(58) Field of Classification Search
CPC ........................ B60R 22/024; B60R 2022/006
(Continued)

(56) References Cited

U.S. PATENT DOCUMENTS 4,786,080 A * 11/1988 Jay .......................... B60R 22/14
280/808
4,921,273 A * 5/1990 Weightman ............. B60R 22/00
280/751
(Continued)

FOREIGN PATENT DOCUMENTS

DE 9107433 U1 10/1992
EP 1454805 A2 9/2004
(Continued)

Primary Examiner — Timothy J Brindley
(74) Attorney, Agent, or Firm — Oliff PLC

(57) ABSTRACT

A vehicle child safety seat includes: a seat main body on which an occupant sits; a seat belt for restraining the occupant to the seat main body, the seat belt including a shoulder harness having a long belt shape and facing a shoulder of the occupant; a shoulder pad placed between the shoulder of the occupant and the shoulder harness; and a harness cover formed in a pouch shape, having paired insertion holes through which the shoulder harness is passed so that the harness cover is attached to the shoulder harness, accommodating the shoulder pad therein, and having an opening so that the shoulder pad is put in and out via the opening in a state where the harness cover is attached to the shoulder harness.

14 Claims, 12 Drawing Sheets

(51) Int. Cl.
  *B60N 2/28* (2006.01)
  *B60R 22/14* (2006.01)
  *B60R 22/10* (2006.01)
  *B60R 22/00* (2006.01)
(52) U.S. Cl.
  CPC ............ B60R 22/105 (2013.01); B60R 22/14 (2013.01); *B60N 2002/2815* (2013.01); *B60N 2002/2818* (2013.01); *B60R 2022/006* (2013.01)
(58) Field of Classification Search
  USPC .............................. 297/482; 280/801.1, 808
  See application file for complete search history.

(56) References Cited

U.S. PATENT DOCUMENTS

| | | | | |
|---|---|---|---|---|
| 4,951,965 | A * | 8/1990 | Brown | B60R 22/024 280/801.1 |
| 5,248,187 | A * | 9/1993 | Harrison | B60R 22/30 297/468 |
| 5,566,871 | A * | 10/1996 | Weintraub | A45F 3/12 2/268 |
| 5,620,234 | A * | 4/1997 | Gunby | B60R 22/00 297/482 |
| 6,273,467 | B1 * | 8/2001 | Berke | B60R 22/14 280/751 |
| 6,382,730 | B1 * | 5/2002 | Closner | B60R 22/00 297/482 |
| 8,146,946 | B1 * | 4/2012 | Emond | B60R 22/30 280/801.1 |
| 8,882,141 | B2 * | 11/2014 | Arnold | B60R 21/18 280/733 |
| 2001/0013719 | A1 | 8/2001 | Carine et al. | |
| 2003/0046750 | A1 | 3/2003 | D'Addario et al. | |
| 2003/0159258 | A1 | 8/2003 | Wetter | |
| 2004/0070256 | A1 * | 4/2004 | Lee | B60R 22/00 297/482 |
| 2006/0108854 | A1 * | 5/2006 | Lo | B60R 21/18 297/482 |
| 2008/0265653 | A1 | 10/2008 | Wetter | |
| 2010/0213696 | A1 | 8/2010 | Kawata et al. | |
| 2011/0156469 | A1 * | 6/2011 | Carpenter | B60R 22/105 297/482 |
| 2011/0227392 | A1 * | 9/2011 | Morrissey | B60N 2/2812 297/482 |
| 2011/0254344 | A1 * | 10/2011 | Freeman | A62B 35/00 297/482 |
| 2012/0205960 | A1 * | 8/2012 | Finch | B60R 22/00 297/470 |
| 2013/0047341 | A1 * | 2/2013 | Currier | B60R 22/105 5/652 |
| 2013/0092100 | A1 * | 4/2013 | Davis | B60R 22/10 119/771 |
| 2013/0207441 | A1 * | 8/2013 | Morrissey | B60R 22/105 297/468 |
| 2013/0249200 | A1 * | 9/2013 | Higuchi | B60R 21/18 280/733 |
| 2013/0298354 | A1 * | 11/2013 | Campbell | B60R 22/024 24/191 |
| 2013/0313811 | A1 * | 11/2013 | Ichida | B60R 21/18 280/733 |
| 2014/0265471 | A1 * | 9/2014 | Haas | B60R 22/024 297/216.11 |
| 2014/0353950 | A1 * | 12/2014 | Yamataki | B60R 21/18 280/728.2 |

FOREIGN PATENT DOCUMENTS

| | | |
|---|---|---|
| EP | 1123833 B1 | 6/2006 |
| EP | 2221212 A2 | 8/2010 |
| JP | 2000-289569 A | 10/2000 |
| JP | 2001-287576 A | 10/2001 |
| JP | 2003-276559 A | 10/2003 |
| JP | 2004-075015 A | 3/2004 |
| JP | 2008-290587 A | 12/2008 |
| JP | 4796049 B2 | 10/2011 |
| JP | 2012-020687 A | 2/2012 |
| JP | 2014-104942 A | 6/2014 |
| JP | 2014-104943 A | 6/2014 |
| WO | 2005/092677 A1 | 10/2005 |
| WO | 2008/146695 A1 | 12/2008 |
| WO | 2014/083404 A1 | 6/2014 |
| WO | 2014/083405 A1 | 6/2014 |

* cited by examiner

VEHICLE CHILD SAFETY SEAT AND HARNESS COVER

BACKGROUND OF THE INVENTION

1. Field of the Invention

The invention relates to a vehicle child safety seat and a harness cover which is attached to a shoulder harness provided in a seat belt of the vehicle child safety seat and which accommodates a shoulder pad therein.

2. Description of Related Art

Japanese Patent Application. Publication No. 2003-276559 (JP2003-276559 A) describes a shoulder pad for a seat belt provided in a vehicle child safety seat. The shoulder pad includes a body portion positioned below a shoulder strap (shoulder harness) so as to abut against a shoulder of a child occupant, a tether strap for attachment to a seat back, and a biforked yoke for connecting the body portion to the tether strap. The shoulder harness is passed through the biforked yoke, and the tether strap extends above the shoulder harness toward a rear side of the seat. Further, the shoulder pad is partially enclosed by a fabric cover.

The shoulder pad is configured such that, in the event of an accident, a friction-increasing surface provided in the body portion is engaged with the shoulder harness. This increases frictional resistance to the shoulder harness, thereby limiting a forward movement of the child.

In the meantime, the vehicle child safety seat is available for children from a baby to an infant. However, a sense of being oppressed may be given to a small infant from the shoulder pad as described above. In view of this, it is preferable to attach or remove the shoulder pad depending on whether an occupant is a baby or an infant.

However, the above-mentioned shoulder pad is configured such that the shoulder strap is passes through a hole between the biforked yoke and the shoulder pad is partially enclosed by the fabric cover. Therefore, attachment and removal operations on the shoulder pad are complicated. That is, generally, the shoulder harness is configured such that an end portion opposite to a tang plate is latched to a latching metal fitting (a hanger) provided on a back-face side of the seat back. As a result, the latching to the hanger should be released on the occasion of attachment and removal of the shoulder pad, which makes the operations complicated.

SUMMARY OF THE INVENTION

The invention provides a vehicle child safety seat and a harness cover each of which achieves easy attachment and removal of a shoulder pad.

A first aspect of the invention relates to a vehicle child safety seat. The vehicle child safety seat includes: a seat main body on which an occupant sits; a seat belt for restraining the occupant to the seat main body, the seat belt including a shoulder harness having a long belt shape and facing a shoulder of the occupant; a shoulder pad placed between the shoulder of the occupant and the shoulder harness; and a harness cover formed in a pouch shape, having paired insertion holes through which the shoulder harness is passed so that the harness cover is attached to the shoulder harness, accommodating the shoulder pad therein, and having an opening so that the shoulder pad is put in and out via the opening in a state where the harness cover is attached to the shoulder harness.

In the above aspect, the shoulder harness is passed through the paired insertion holes formed in the harness cover. Hereby, the harness cover is attached to the shoulder harness. The harness cover is formed in a pouch shape. The shoulder pad accommodated inside the harness cover is placed between the shoulder of the occupant and the shoulder harness. This makes it possible to effectively restrain the shoulder of the occupant at the time of a vehicle crash, thereby making it possible to effectively limit a forward movement of the occupant while relaxing a pressure on a chest of the occupant. Besides, the opening is formed in the harness cover. The shoulder pad is able to be put in and out via the opening in a state where the harness cover is attached to the shoulder harness. Accordingly, it is possible to easily attach and remove the shoulder pad depending on whether the occupant is a baby or an infant.

In the above aspect, the opening may be opened in a width direction of the shoulder harness.

In the above aspect, the opening of the harness cover is opened in the width direction of the shoulder harness. This allows the shoulder pad to be easily put in and out, in comparison with a case where the opening is opened in a longitudinal direction of the shoulder harness.

In the above aspect, the harness cover may include: a body portion formed in a pouch shape so as to accommodate the shoulder pad therein and having the paired insertion holes and the opening; a door portion extended from an edge portion of the opening in the body portion and folded toward the body portion so as to cover the opening; and a door latch portion for latching, to the body portion, the door portion thus folded toward the body portion.

In the above aspect, the shoulder pad is accommodated in the body portion that is formed in a pouch shape in the harness cover. The body portion includes the paired insertion holes through which the shoulder harness is passed, and the opening via which the shoulder pad is put in and out. The door portion is extended from the edge portion of the opening. The door portion is folded toward the body portion and latched to the body portion by means of the door latch portion in a state where the door portion covers the opening of the body portion. This makes it possible to inhibit the shoulder pad accommodated inside the body portion from being viewed from outside through the opening. As a result, it is possible to achieve good appearance. Further, it is possible to inhibit the shoulder pad from making contact with the occupant. This, consequently makes it possible to improve comfortability to the occupant.

In the above aspect, the harness cover may include: a body portion formed in a pouch shape so as to accommodate the shoulder pad therein and having the paired insertion holes and the opening; and a nonslip portion attached to that surface of the body portion which faces the shoulder of the occupant and having that coefficient of surface friction which is set to be higher than that of the body portion.

In the above aspect, the shoulder pad is accommodated in the body portion that is formed in a pouch shape in the harness cover. The nonslip portion is attached to that surface of the body portion which faces the shoulder of the occupant. A coefficient of surface friction of the nonslip portion is set to be higher than that of the body portion of the harness cover. This makes it possible to inhibit careless displacement of the harness cover and the shoulder pad accommodated in the harness cover with respect to the shoulder of the occupant.

In the above aspect, the opening of the harness cover may be formed so as to be shorter than the shoulder pad, and when the shoulder pad is put in and out from the harness cover, the shoulder pad may be bent.

In the above aspect, due to the above configuration, if the shoulder pad is not bent, it is difficult for the shoulder pad to be put in and out from the harness cover. This makes it possible to inhibit the shoulder pad from falling off the harness cover carelessly and to inhibit the shoulder pad from being displaced carelessly with respect to the harness cover.

In the above aspect, the body portion of the harness cover may include a cutout portion formed in the edge portion of the opening toward a side opposite to a side where the door portion is extended.

In the above aspect, the cutout portion is formed in the body portion of the harness cover, as described above. This allows the shoulder pad to be further easily put in and out from the harness cover.

In the above aspect, the shoulder pad may include: a hold member formed of a material having a flexibility, and including an elongated tabular portion placed along the shoulder harness; and a plurality of hard members each formed of a material that is harder than the hold member, the plurality of hard members being attached to that surface of the tabular portion which faces the shoulder harness, with intervals therebetween in a longitudinal direction of the tabular portion.

In the above aspect, the shoulder pad includes the hold member formed of a material having a flexibility, and the plurality of hard members each formed of a material that is harder than the hold member. The hold member includes the tabular portion that is elongated and is placed along the shoulder harness. The plurality of hard members is provided side by side in the longitudinal direction of the tabular portion. The plurality of hard members is attached to that surface of the tabular portion which faces the shoulder harness. Accordingly, the tabular portion is placed between the plurality of hard members and the shoulder of the occupant. This makes it possible to inhibit the occupant from feeling uncomfortable due to rough texture of the plurality of hard members. Further, the hold member is formed of a material having a flexibility. This allows those parts of the tabular portion of the hold member which are placed between the plurality of hard members to function as hinges. This accordingly allows the tabular portion to be fitted to the shoulder of the occupant successfully. As a result, it is possible to ensure comfortability to the occupant.

Further, at the time of a vehicle crash, it is possible to support a load from the shoulder of the occupant successfully by the plurality of hard members placed between the shoulder harness and the tabular portion, and it is possible to ensure a pressure receiving area with respect to the shoulder of the occupant due to the tabular portion. This makes it possible to achieve a successful occupant restraint performance.

In the above aspect, the shoulder pad may be formed in an elongated shape along a longitudinal direction of the shoulder harness, and paired guide claws facing respective end portions of the shoulder harness in its width direction from a side opposite to the occupant may be provided on either end portion of the shoulder pad in its longitudinal direction.

In the above aspect, the paired guide claws provided on either end portion of the shoulder pad in the longitudinal direction face respective end portions of the shoulder harness in the width direction from a side opposite to the occupant. This allows both end portions of the shoulder pad in the longitudinal direction to be connected to the shoulder harness. As a result, it is possible to inhibit careless displacement of the shoulder pad with respect to the shoulder harness. In addition, when the shoulder pad is put in and out from the harness cover, an intermediate part of the shoulder harness in the longitudinal direction is able to be put in and out from between the paired guide claws. Accordingly, it is possible to easily attach and remove the shoulder pad.

In the above aspect, two harness covers may be provided so as to make contact with right and left shoulders of the occupant. The two harness covers are connected to each other via a strap. The strap is connected to the seat main body.

In the above aspect, the door portion covers the opening and the insertion holes.

A second aspect of the invention relates to a harness cover. The harness cover includes: a body portion formed in a pouch shape, having paired insertion holes through which a shoulder harness provided in a seat belt for restraining an occupant sitting on a vehicle child safety seat is passed so that the body portion is attached to the shoulder harness, accommodating a shoulder pad therein, and having an opening so that the shoulder pad is put in and out via the opening in a state where the body portion is attached to the shoulder harness; a door portion extended from an edge portion of the opening in the body portion and folded toward the body portion so as to cover the opening; and a door latch portion for latching, to the body portion, the door portion folded toward the body portion.

In the above aspect, the shoulder pad is accommodated inside the body portion that is formed in a pouch shape. The body portion is attached to the shoulder harness such that the shoulder harness is passed through the paired insertion holes. Further, the opening is formed in the body portion. This allows the shoulder pad to be put in and out via the opening in a state where the body portion is attached to the shoulder harness. Accordingly, it is possible to easily attach and remove the shoulder pad depending on whether the occupant is a baby or an infant. Further, the door portion is extended from the edge portion of the opening in the body portion. The door portion is folded toward the body portion and latched to the body portion by means of the door latch portion in a state where the door portion covers the opening of the body portion. This makes it possible to inhibit the shoulder pad accommodated inside the body portion from being viewed from outside through the opening. As a result, it is possible to achieve good appearance. Further, it is possible to inhibit the shoulder pad from making contact with the occupant. This makes it possible to improve comfortability to the occupant.

In the above aspect, the harness cover may further include a strap attached to the body portion and connecting the harness cover to the other harness cover.

In the above aspect, the door portion may cover the opening and the insertion holes.

As described above, according to the first and second aspects of the invention, it is possible to easily attach and remove the shoulder pad.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes a vehicle child safety seat 10 and a harness cover 16 according to an embodiment of the invention with reference to FIGS. 1 to 12. Note that an arrow FR shown in each drawing appropriately indicates a vehicle front direction, and an arrow UP indicates a vehicle upper direction, and an arrow W indicates a vehicle width direction.

(Overall Configuration)

Figure 1:
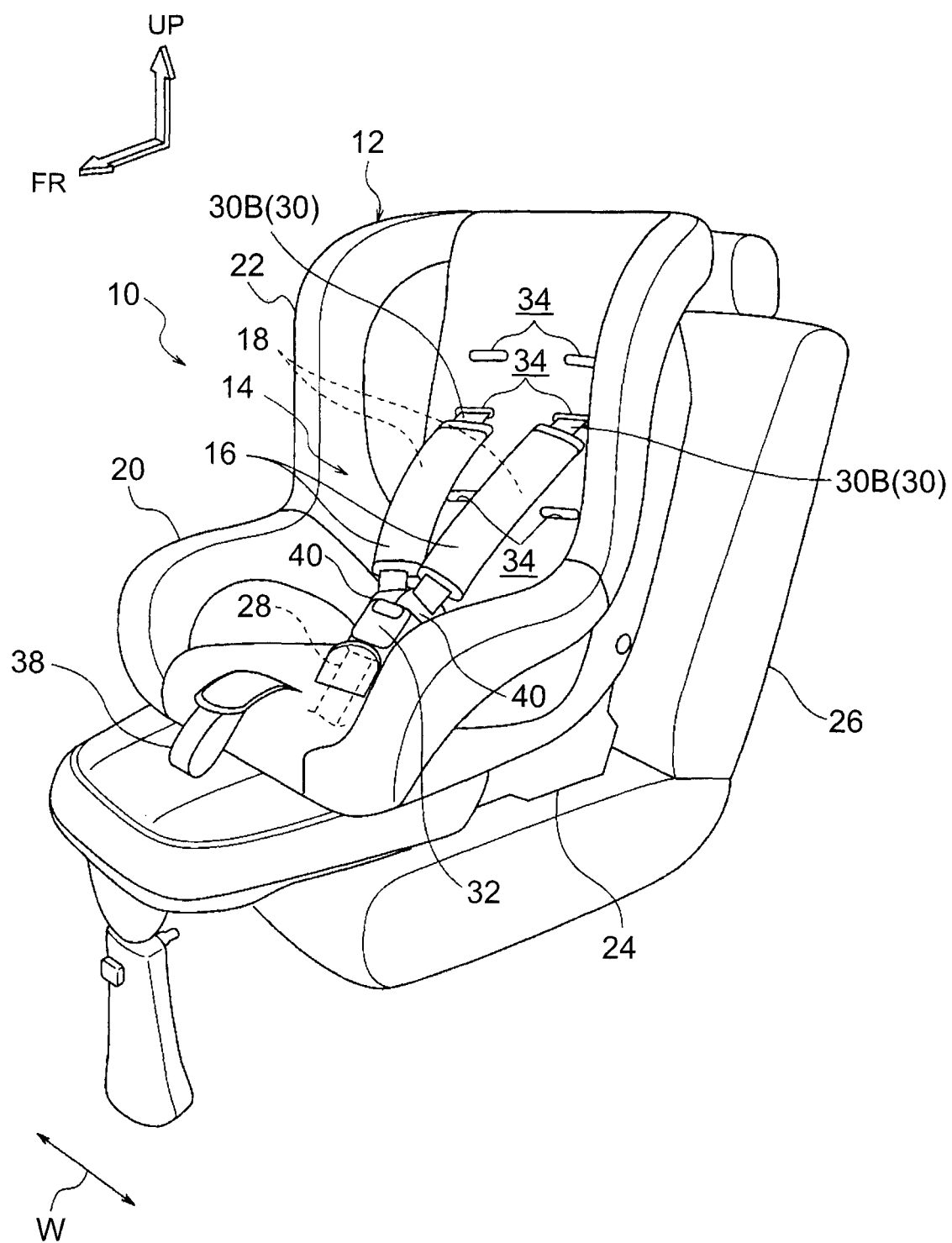
FIG. 1 is a perspective view illustrating a state where a vehicle child safety seat is attached to a vehicle seat, when viewed from a diagonal front side.
Figure 2:
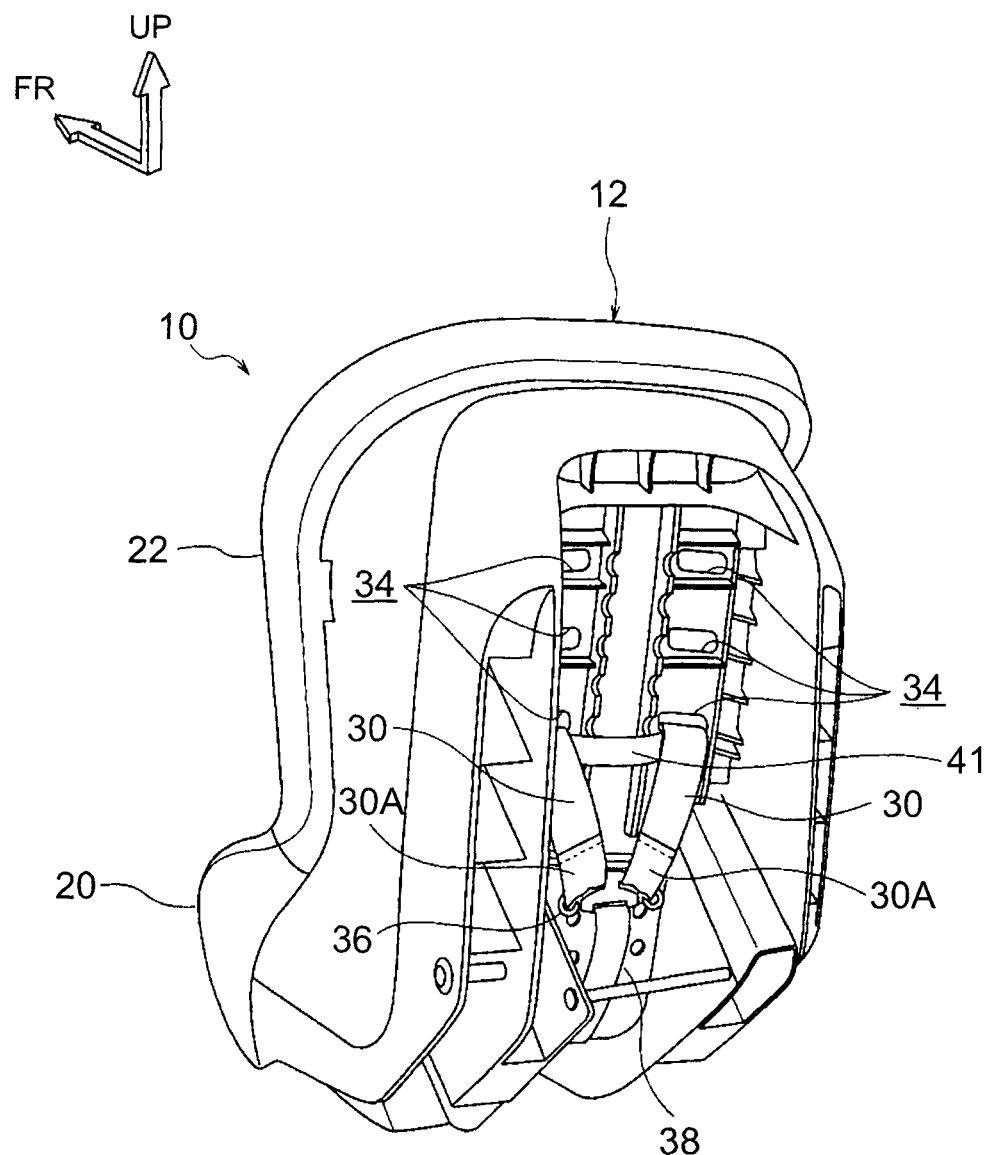
FIG. 2 is a perspective view of a vehicle child safety seat according to an embodiment of the invention, when viewed from a diagonal rear side.

As illustrated in FIGS. 1 and 2, the vehicle child safety seat 10 according to the present embodiment includes a seat main body 12. The seat main body 12 is provided with a seat belt 14, and paired right and left harness covers 16 are attached to the seat belt 14. Respective shoulder pads 18 (see FIG. 3) are accommodated inside harness covers 16. The following describes each constituent.

(Configuration of Seat Main Body 12)

The seat main body 12 includes a seat cushion 20 on which a baby or infant occupant P (see FIG. 3) sits, and a seat back 22 serving as a backrest for the occupant P. The seat main body 12 is fixed to a vehicle seat 26 via a base 24 (see FIG. 1) in accordance with ISOFIX, which is an international standard correspondence. Note that how to fix the seat main body 12 is not limited to the above. The seat main body 12 may be configured so as to be fixed to the vehicle seat 26 by means of a seat belt provided in a vehicle or the vehicle seat 26.

(Configuration of Seat Belt 14)

The seat belt 14 is intended to restrain the occupant P to the seat main body 12, and includes a crotch strap 28 and paired right and left shoulder harnesses 30 as illustrated in FIG. 1. The crotch strap 28 and the right and left shoulder harnesses 30 are formed in a long belt shape. One end portion of the crotch strap 28 in its longitudinal direction is fixed to a vicinity of a central part of the seat cushion 20, and a buckle 32 is fixed to the other end portion of the crotch strap 28 in the longitudinal direction.

One end portion of the left shoulder harness 30 in its longitudinal direction is fixed to a rear end portion of the seat cushion 20 on its left side. One end portion of the right shoulder harness 30 in its longitudinal direction is fixed to a rear end portion of the seat cushion 20 on its right side. Further, the other ends of the right and left shoulder harnesses 30 in the longitudinal direction are passed through paired right and left slots 34 (shoulder-harness through holes) formed in the seat back 22, and are drawn out to a back-face side of the seat back 22. A plurality of pairs (three pairs herein) of right and left slots 34 is formed side by side in a height direction of the seat back 22, so that the shoulder harnesses 30 are passed through appropriate slots 34 in accordance with a sitting height of the occupant P.

At illustrated in FIG. 2, respective latching portions 30A are provided in those other end portions of the right and left shoulder harnesses 30 in the longitudinal direction which are drawn out to the back-face side of the seat back 22. The respective latching portions 30A are formed in a loop shape such that the other end portions of the right and left shoulder harnesses 30 in the longitudinal direction are folded and sewn. The latching portions 30A are removably latched to a hanger 36, which is a substantially T-shaped latching metal fitting provided on the back-face side of the seat back 22. One end portion of a harness adjuster 38 in its longitudinal direction, which harness adjuster 38 is an adjusting belt, is fixed to the hanger 36. The harness adjuster 38 extends to a bottom side of the seat cushion 20. The other end portion of the harness adjuster 38 in the longitudinal direction is drawn out to a front-face side of the seat cushion 20 (see FIG. 1).

Respective tang plates 40 are slidably attached to intermediate parts of the right and left shoulder harnesses 30 in the longitudinal direction, on a front-face side of the seat back 22. When the occupant P sitting on the seat main body 12 puts on the seat belt 14, the right and left shoulder harnesses 30 are put around right and left shoulders S (see FIG. 3), and the right and left tang plates 40 are combined and connected to the buckle 32. When the harness adjuster 38 is subsequently pulled toward a front side of the seat cushion 20, those other end portions of the right and left shoulder harnesses 30 in the longitudinal direction which are latched to the hanger 36 are pulled downward. As a result, slack of the intermediate parts in the longitudinal direction of the right and left shoulder harnesses 30 is removed. Hereby, the occupant P is in a seat belt fitting state. In this fitting state, the right and left shoulder harnesses 30 face the right and left shoulder S of the occupant P (see FIG. 3).

(Configuration of Harness Cover 16)

Figure 4:
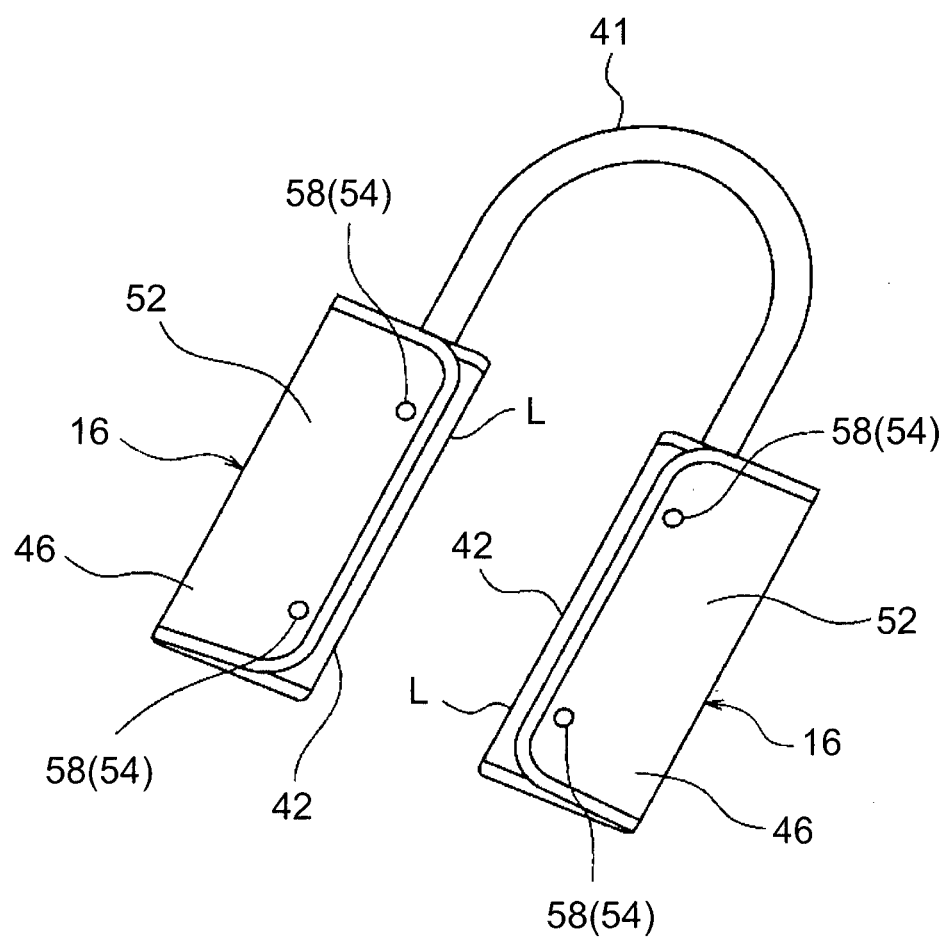
FIG. 4 is a perspective view illustrating a harness cover included in the vehicle child safety seat according to the embodiment of the invention.

The right and left harness covers 16 are each formed such that a sheet material (a fabric material 46 illustrated in FIGS. 4 and 5) having a flexibility is sewn, and are attached to the right and left shoulder harnesses 30 so as to make contact with the right and left shoulders S of the occupant P. The right and left harness covers 16 are connected to each other via a strap 41, as illustrated in FIG. 4.

Figure 5:
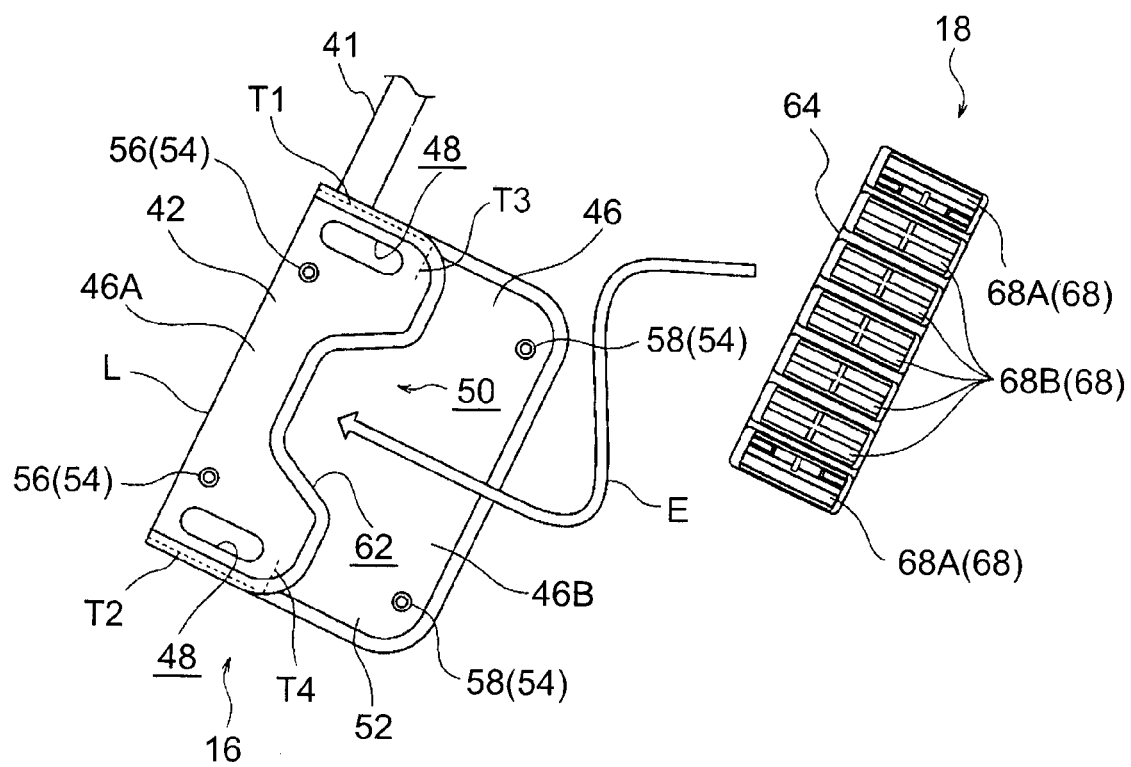
FIG. 5 is a perspective view illustrating the harness cover according to the embodiment of the invention and a shoulder pad accommodated in the harness cover.

Each of the harness covers 16 includes a body portion 42 formed in a long pouch shape, as illustrated in FIG. 5. The body portion 42 is formed such that the fabric material 46 cut out into in a substantially rectangular shape is folded along a fold line L, and one side portion 46A of the fabric material 46 and the other side portion 46B thereof via the fold line L are sewn up at sewing portions T1, T2 placed at respective end portions of the body portion 42 in its longitudinal direction.

Paired insertion holes 48 are formed in the respective end portions of the body portion 42 in the longitudinal direction. The paired insertion holes 48 are formed on the one side portion 46A of the fabric material 46, and are each formed in a long hole that is elongated along a width direction of the body portion 42. A part (hereinafter referred to as a restraint portion 30B) of the intermediate part of the shoulder harness 30 in the longitudinal direction which part is placed between the slot 34 and the tang plate 40 is passed through the insertion holes 48. Hereby, the body portion 42 is attached to the shoulder harness 30 slidably in its longitudinal direction. In this attachment state, the longitudinal direction of the body portion 42 coincides with the longitudinal direction of the shoulder harness 30, and the width direction of the body portion 42 coincides with a width direction of the shoulder harness 30.

One end portion (an end portion opposite to the fold line L) of the body portion 42 in the width direction is not sewn, and an opening 50 that is opened toward one side of the shoulder harness 30 in the width direction is formed. The opening 50 is formed in an elongated shape with the longitudinal direction of the body portion 42 being taken as a longer side. On respective sides of the opening 50 in its longitudinal direction, the one side portion 46A of the fabric material 46 and the other side portion 46B thereof are sewn up at sewing portions T3, T4 (see FIG. 5) for inhibiting shoulder-pad falling. Hereby, a linear dimension of the opening 50 is shorter than a linear dimension of the body portion 42. Note that the sewing portions T3, T4 may be omitted such that the sewing portions T1, T2 are extended to areas where the sewing portions T3, T4 are provided.

A door portion 52 is extended from an edge portion of the opening 50 in the body portion 42. The door portion 52 is constituted by the other side portion 46B of the fabric material 46. As illustrated in FIG. 4, the door portion 52 is folded toward the body portion 42 so as to cover the opening 50 and the paired insertion holes 48, and is latched to the body portion 42 by means of paired snap buttons 54 serving as a door latch portion. Each of the snap buttons 54 is constituted by a projection member 56 fixed to the body portion 42, and a recessed member 58 fixed to the door portion 52. When the projection member 56 separably engages with the recessed member 58, the door portion 52 is latched to the body portion 42. Note that the door latch portion is not limited to the above, and is modifiable appropriately. For example, a hook-and-loop fastener and the like can be used as the door latch portion.

Figure 3:
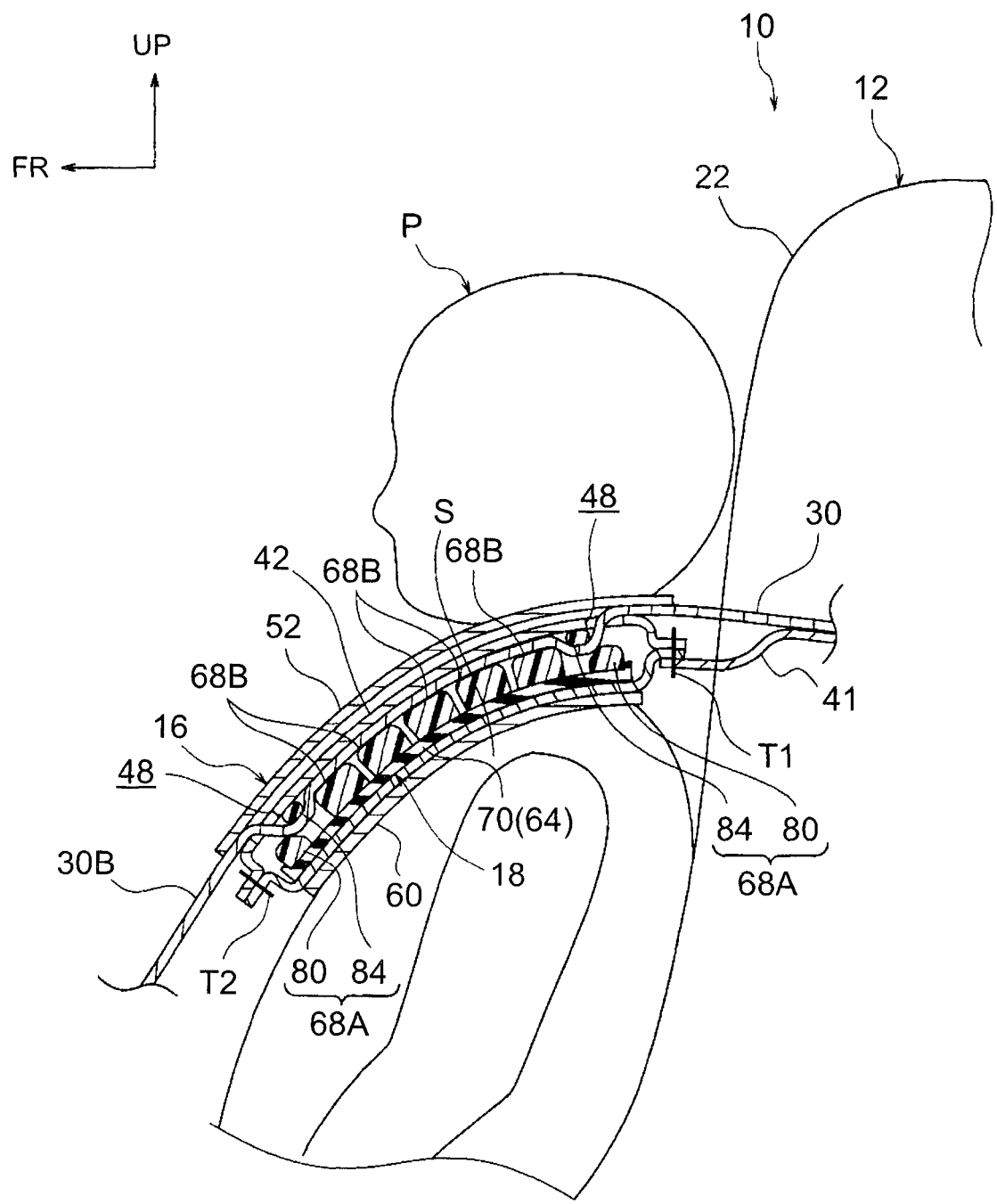
FIG. 3 is a sectional view illustrating a partial configuration of the vehicle child safety seat according to the embodiment of the invention, and illustrating a state where an occupant is restrained by a seat belt of the vehicle child safety seat, when viewed from a seat-width direction.

Further, as illustrated in FIG. 3, a nonslip portion 60 formed in a sheet shape is attached to that surface of the body portion 42 which faces the shoulder S of the occupant P (that surface of the other side portion 46B of the fabric material 46 which is opposite to a side facing the one side portion 46A). The nonslip portion 60 is formed, for example, of synthetic leather, and is fixed to the body portion 42 by sewing or the like. A coefficient of friction on that surface of the nonslip portion 60 which makes contact with the shoulder S of the occupant P is set to be higher than a coefficient of surface friction of the body portion 42.

Further, as illustrated in FIG. 5, the body portion 42 includes a cutout portion 62 formed in the edge portion of the opening 50 (a portion constituted by the one side portion 46A) toward a side opposite to a side where the door portion 52 is extended. The cutout portion 62 is formed in a central part of the body portion 42 in its longitudinal direction, and is cut out in a substantially rectangular shape toward the fold line L.

Further, as illustrated in FIG. 4, the right and left harness covers 16 are formed symmetrically. The harness covers 16 are passed through the right and left slots 34 from the back-face side of the seat back 22, and are drawn out to the front-face side of the seat back 22. Hereby, an intermediate part of the strap 41 in its longitudinal direction is hooked on the back-face side of the seat back 22, as illustrated in FIG. 2, and the right and left harness covers 16 are connected to the seat back 22. The respective shoulder pads 18 are accommodated inside the right and left harness covers 16.

(Configuration of Shoulder Pad 18)

Figure 6:
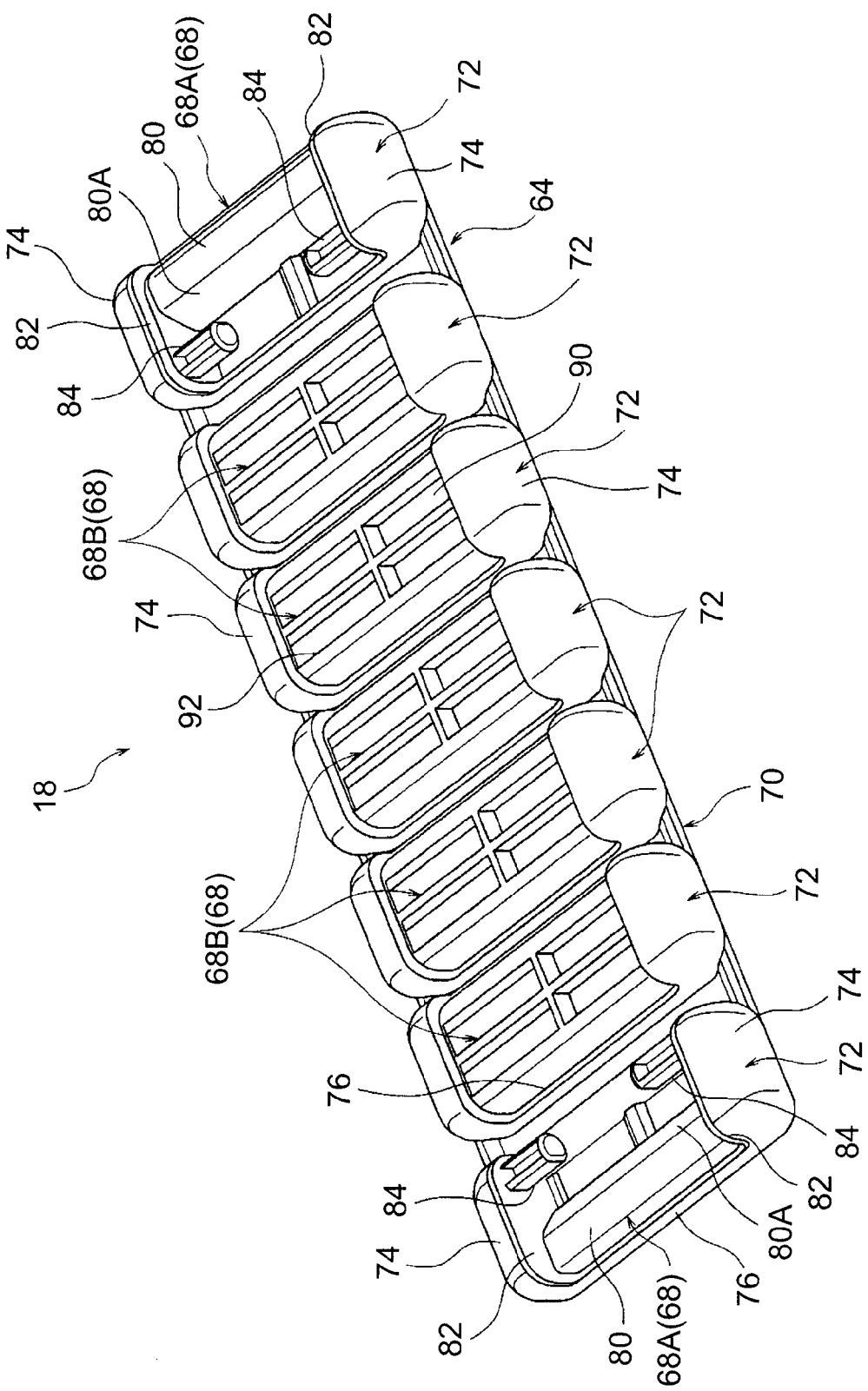
FIG. 6 is an enlarged perspective view of the shoulder pad according to the embodiment of the invention.
Figure 7:
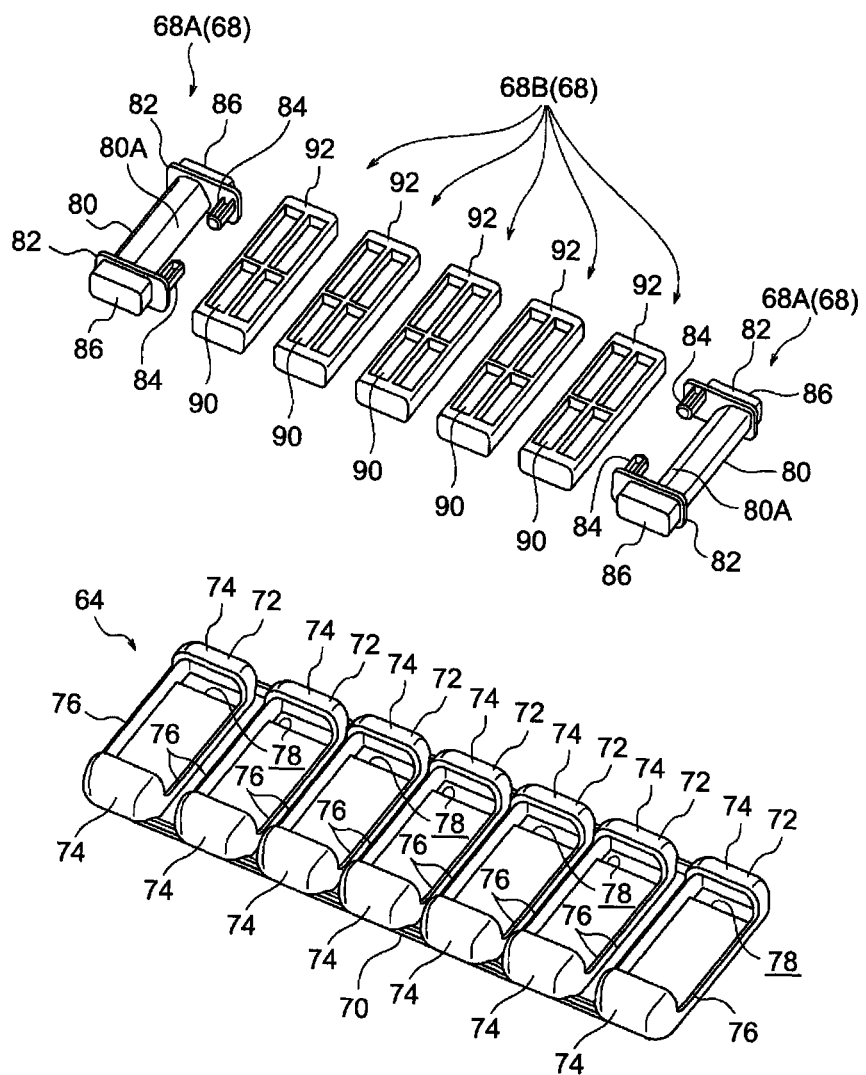
FIG. 7 is an exploded perspective view of the shoulder pad according to the embodiment of the invention.

As illustrated in FIGS. 6 and 7, the shoulder pad 18 is provided as a different member from the harness cover 16. The shoulder pad 18 is constituted by a hold member 64 formed of a material (elastomer rubber, herein) having a flexibility, and a plurality of (seven, herein) inserts 68 (hard members) formed of a material (resin such as polypropylene, herein) that is harder than the material of the hold member 64.

Figure 8:
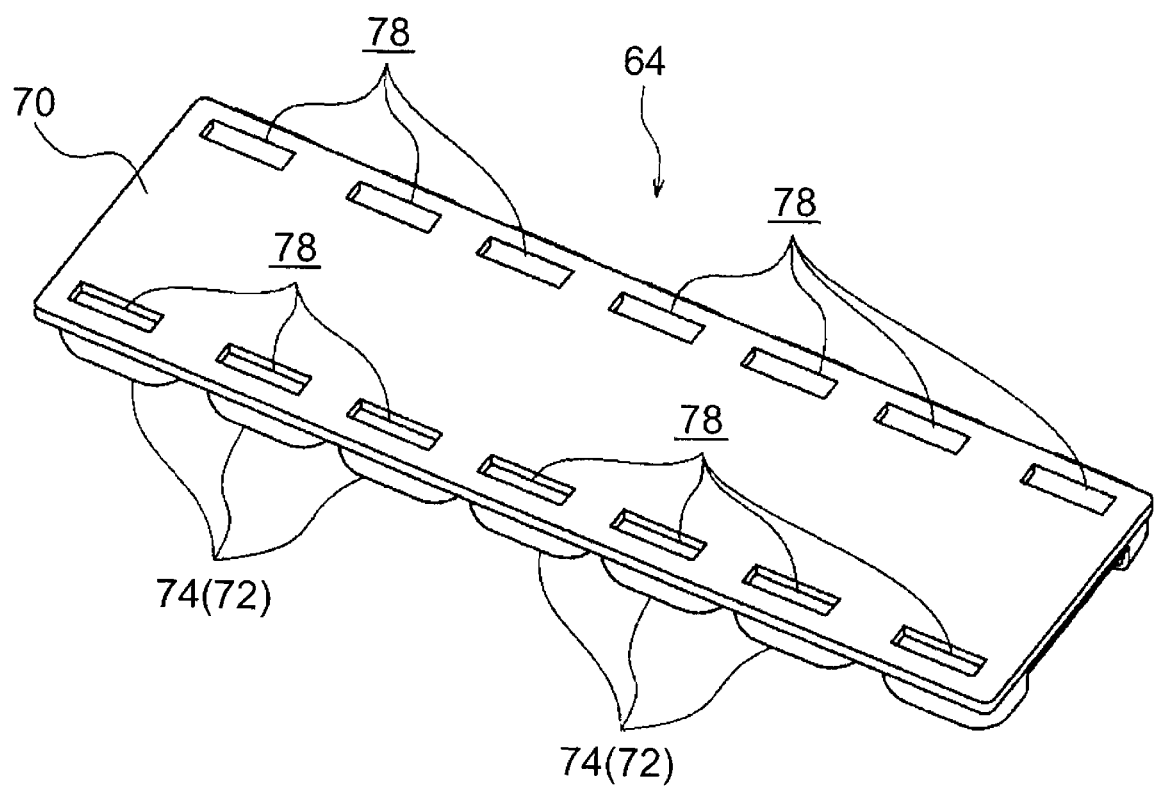
FIG. 8 is a perspective view of a hold member, which is a constituent member of the shoulder pad according to the embodiment of the invention, when viewed from a back side thereof.

As illustrated in FIGS. 7 and 8, the hold member 64 is constituted by a tabular portion 70 formed in an elongated plate shape, and a plurality of (seven, herein) hold portions 72 formed on one surface of the tabular portion 70. The hold member 64 is formed in an elongated and substantially plate shape as a whole.

The plurality of hold portions 72 is provided side by side at some intervals in a longitudinal direction of the tabular portion 70. Each of the hold portions 72 includes paired projecting portions 74 projecting from respective end portions of the tabular portion 70 in its width direction, and paired displacement inhibition portions 76 for connecting the paired projecting portions 74 in the width direction of the tabular portion 70. Each of the hold portions 72 is formed in a frame shape, when viewed from a thickness direction of the tabular portion 70.

Each of the projecting portions 74 is formed in an elongated shape along the longitudinal direction of the tabular portion 70, and is opened toward an inner side of the tabular portion 70 in the width direction. Further, a space between the paired the projection portions 74 is set to be wider than a width dimension of the shoulder harness 30. A projection height of the paired displacement inhibition portions 76 from the tabular portion 70 is set to be lower than that of the paired projecting portions 74, and the paired displacement inhibition portions 76 are provided over between respective end portions of the paired projecting portions 74 in their longitudinal direction.

As illustrated in FIG. 8, a through hole 78 having a substantially rectangular shape is formed at that part of the tabular portion 70 which faces each of the projecting portions 74. When the hold member 64 is molded, protrusions provided in a die to form the projecting portions 74 are inserted into these through, holes 78. This allows the hold member 64 to be molded without using a slide mold.

In the meantime, the plurality of inserts 68 is constituted by paired connection inserts 68A (hard members for connection) that are held by paired hold portions 72 placed at respective end portions of the hold member 64 in the longitudinal direction, and a plurality of non-connection inserts 68B (non-connection hard members) respectively held by a plurality of hold portions 72 (five hold portions 72, herein) placed between the paired hold portions 72. The connection inserts 68A and the non-connection inserts 68B are formed in an elongated shape where the width direction of the tabular portion 70 is taken as a longer side, and have a linear dimension that is set to be sufficiently larger than a width dimension of the shoulder harness 18.

The paired connection inserts 68A are each constituted by an inner guide portion 80 formed in an elongated and substantially prismatic shape where the width direction of the tabular portion 70 is taken as a longer side, paired side walls 82 extended in a substantially rib shape from respective end portions of the inner guide portion 80 in its longitudinal direction, paired guide claws 84 (outer guide portions) projecting from the paired side walls 82 into a direction where the paired guide claws 84 come closer to each other, and paired engageable portions 86 projecting from surfaces of the paired side walls 82 which surfaces are opposite to surfaces that face the inner guide portion 80. The inner guide portion 80 and the paired guide claws 84 constitute a connection portion for slidably connecting the shoulder pad 18 to the shoulder harness 30. The paired guide claws 84 (outer guide portions) are separated from each other in a width direction of the shoulder harness 30.

The paired engageable portions 86 (respective end portions in the longitudinal direction) in each of the connection inserts 68A are fitted to respective inner sides of the paired projecting portions 74 of the hold portion 72 that is placed at an end portion of the hold member 64 in its longitudinal direction. Further, each of the connection inserts 68A fits in between the paired displacement inhibition portions 76, so that displacement thereof in the longitudinal direction of the tabular portion 70 is regulated. Hereby, each of the connection inserts 68A is held by its corresponding end portion of the hold member 64 in the longitudinal direction.

The paired connection inserts 68A are formed to have the same shape. The paired guide claws 84 are placed so as to deviate from the inner guide portion 80 in the longitudinal direction of the tabular portion 70, while, deviating therefrom in a direction where the paired guide claws 84 are separated from the tabular portion 70. Note that the paired connection inserts 68A are attached to the hold member 64 in different orientations. That is, each of the paired connection inserts 68A is attached to the hold member 64 such that its paired guide claws 84 are placed closer to a center of the tabular portion 70 in the longitudinal direction relative to its inner guide portion 80.

Figure 9:
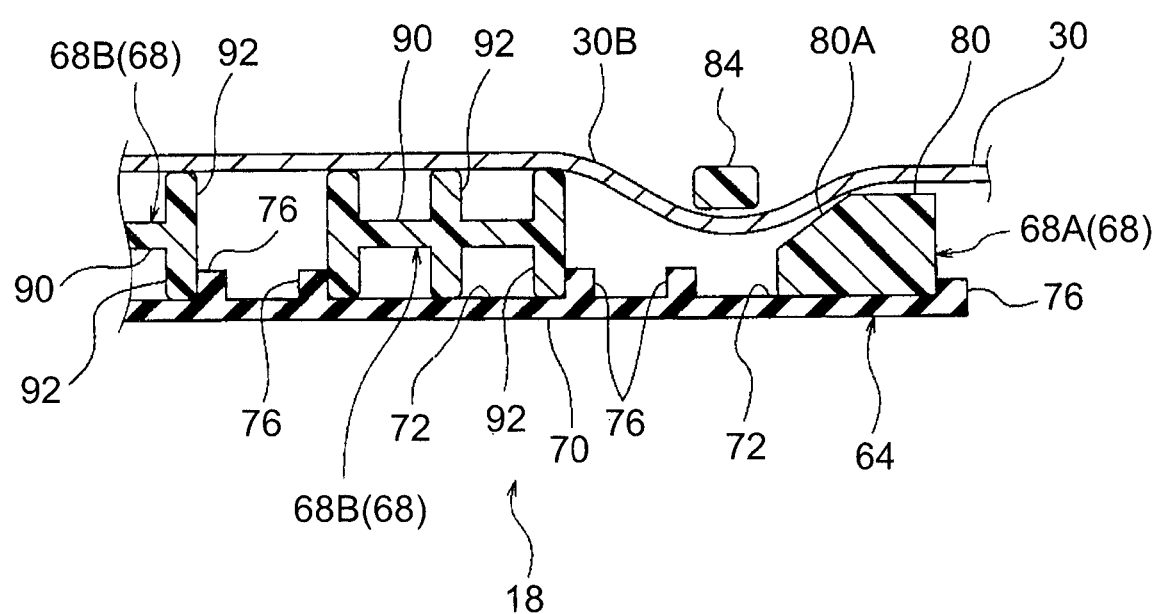
FIG. 9 is an expanded sectional view illustrating a configuration around a connection portion of a shoulder harness in the shoulder pad according to the embodiment of the invention.
Figure 10:
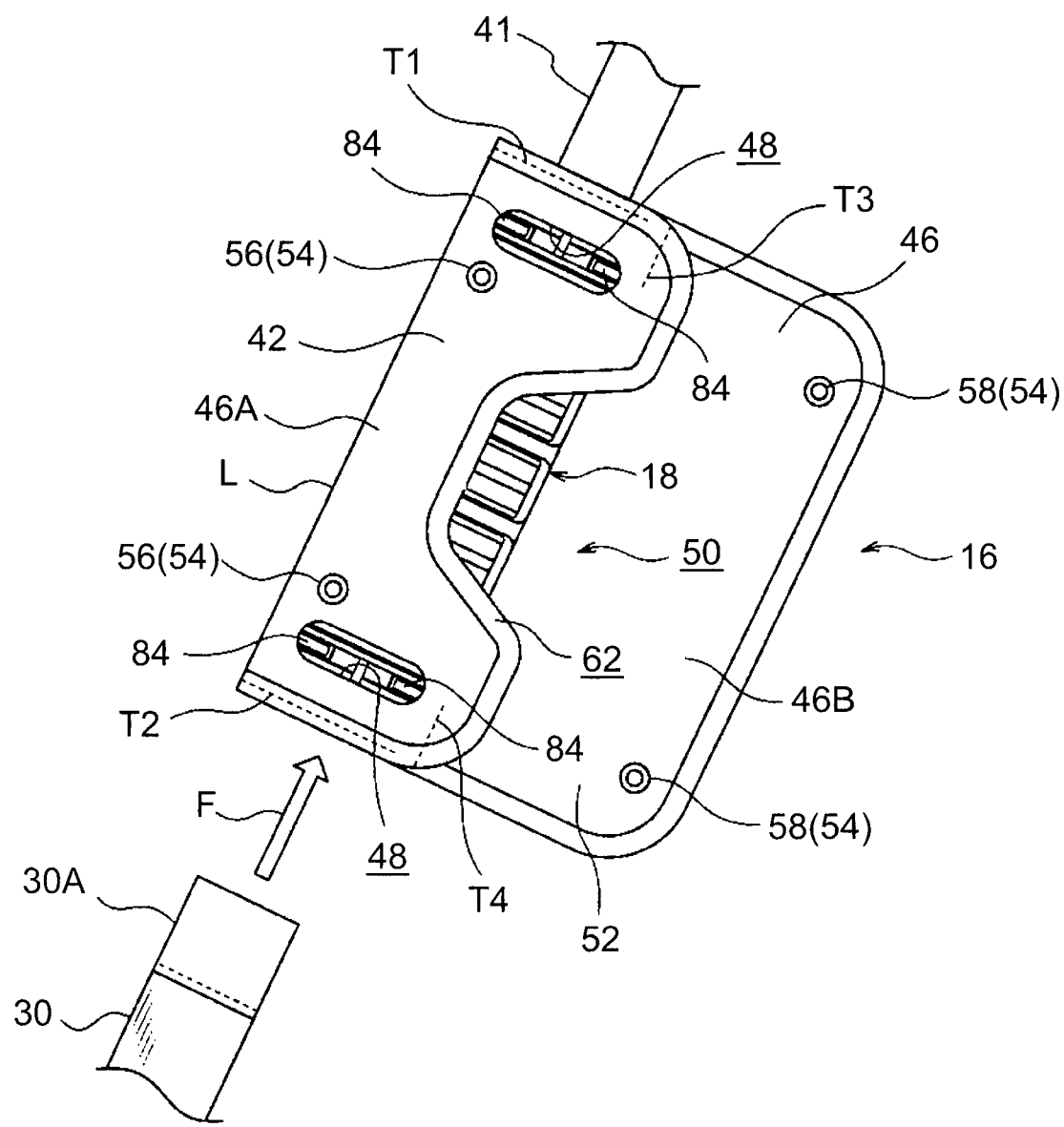
FIG. 10 is a perspective view to describe how to attach, to the shoulder harness, the harness cover that accommodates therein the shoulder pad according to the embodiment of the invention.
Figure 11:
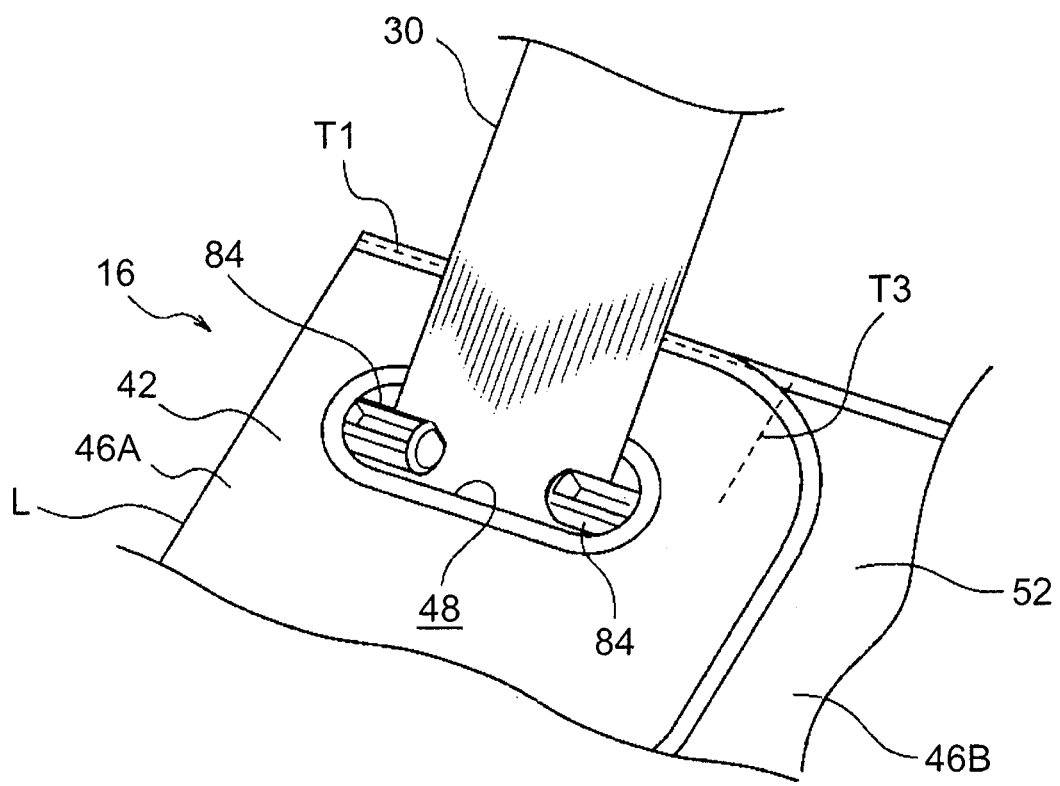
FIG. 11 is an enlarged perspective view illustrating a state where the shoulder harness is passed through an insertion hole of the harness cover according to the embodiment of the invention and paired guiding claws of the shoulder pad are engaged with, the shoulder harness.

Further, as illustrated in FIG. 9, the inner guide portion 80 of each of the connection inserts 68A is provided with a guide surface 80A inclined or curved (inclined, herein) so that its projection height from the tabular portion 70 is decreased as the guide surface 80A goes toward a center of the hold member 64 in its longitudinal direction, and the guide surface 80A faces the paired guide claws 84.

In the meantime, the non-connection insert 68B is constituted by a member main body 90 formed in an elongated plate shape, and a rib portion 92 provided on either side of the member main body 90. The non-connection insert 68B is configured such that both sides of the member main body 90 have the same configuration, and the non-connection insert 68B is formed in an elongated and substantially plate shape as a whole. Note that, in the present embodiment, three longitudinal ribs extending in a longitudinal direction of the member main body 90, and three lateral ribs extending in a width direction of the member main body 90 are connected in a lattice shape (a cross inside a square shape), thereby constituting the rib portion 92. However, a shape of the rib portion is not limited to this, and is modifiable appropriately.

Each of the plurality of non-connection inserts 68B is configured such that respective end portions thereof in its longitudinal direction are fitted to inner sides of the paired projecting portions 74 of its corresponding hold portion 72. Further, each of the plurality of non-connection inserts 68B fits in between the paired displacement inhibition portions 76 of the corresponding hold portion 72, so that displacement of the each of the plurality of non-connection inserts 68B in the longitudinal direction of the tabular portion 70 is regulated. Hereby, the plurality of non-connection inserts 68B is attached to a central side of the hold member 64 in its longitudinal direction between the paired connection inserts 68A.

Further Description of the Present Embodiment

The shoulder pad 18 having the above configuration is accommodated in the body portion 42 of the harness cover 16 and is covered with the harness cover 16. As illustrated in FIG. 3, the shoulder pad 18 in the harness cover 16 is placed so that the longitudinal direction of the hold member 64 (the longitudinal direction of the tabular portion 70) goes along a longitudinal direction of the restraint portion 30B of the shoulder harness 30, and the plurality of inserts 68 is placed at a shoulder-harness-30 side relative to the tabular portion 70. Accordingly, in a state where the occupant P puts on the seat belt 14, the tabular portion 70 of the hold member 64 is placed between the shoulder S of the occupant P and the plurality of inserts 68. Note that FIG. 3 schematically illustrates the plurality of inserts 68.

As illustrated in FIGS. 3 and 9, the restraint portion 30B of the shoulder harness 30 is passed through between the paired guide claws 84 and the inner guide portion 80 in each of the paired connection inserts 68A. The paired guide claws 84 face (engage with) a surface of the shoulder harness 30 which surface is opposite to a side facing the occupant, and the inner guide portion 80 faces (engages with) a surface of the shoulder harness 30 which surface faces the occupant. Hereby, the shoulder pad 18 is connected to the shoulder harness 30 slidably in its longitudinal direction, and displacement of the shoulder pad 18 in its width direction relative to the shoulder harness 30 is regulated. That part of the restraint portion 30B of the shoulder harness 30 which is placed between the paired connection inserts 68A makes contact with the non-connection inserts 68B. On that account, when the shoulder pad 18 slides over the shoulder harness 30 in the longitudinal direction, the rib portions 92 of the non-connection inserts 68B slide over and come in contact with the shoulder harness 30. Further, as described above, the displacement of the shoulder pad 18 in the width direction relative to the shoulder harness 30 is regulated. Thus, the rubber hold member 64 is configured so as not to make contact with the shoulder harness 30.

The shoulder pad 18 is formed slightly smaller in size than the body portion 42 of the harness cover 16. That is, the shoulder pad 18 is configured so as to be accommodated in the body portion 42 without play. Accordingly, the shoulder pad 18 slides integrally with the harness cover 16 relative to the shoulder harness 30 in the longitudinal direction.

The paired insertion holes 48 of the harness cover 16 are each formed at a position that faces the paired guide claws 84 of each of the connection inserts 68A. The paired guide claws 84 are exposed outside the body portion 42 via their corresponding insertion hole 48. Further, in the present embodiment, the paired connection inserts 68A and the plurality of non-connection inserts 68B have a color different from that of the shoulder harness 30. For example, the paired connection inserts 68A and the plurality of non-connection insert 68B are molded from pink resin, while the shoulder harness 30 is formed of a black fiber.

Further, the opening 50 is formed in the body portion 42 of the harness cover 16 as previously described, so that the shoulder pad 18 is able to be put in and out via the opening 50. Note that the linear dimension of the opening 50 is set to be shorter than the linear dimension of the shoulder pad 18. When the shoulder pad 18 is put in and out from the body portion 42, the shoulder pad 18 is bent.

(Attachment of Harness Cover 16 and Shoulder Pad 18)

When the harness cover 16 and the shoulder pad 18 as described above are attached to the shoulder harness 30, the shoulder pad 18 is initially inserted in the body portion 42 via the opening 50 of the harness cover 16 as shown by an arrow E in FIG. 5. Subsequently, the latching portion 30A of the shoulder harness 30 (the other end portion thereof in the longitudinal direction) is inserted in the body portion 42 from one of the insertion holes 48 of the body portion 42 as shown by an arrow F in FIG. 10, and then drawn out from the other one of the insertion holes 48 to outside of the body portion 42. At this time, the shoulder harness 30 is passed through between the paired guide claws 84 and the inner guide portion 80 in each of the connection inserts 68A (see FIG. 11). Subsequently, the door portion 52 of the harness cover 16 is folded toward the body portion 42, and is latched to the body portion 42 by means of the paired snap buttons 54.

That latching portion 30A of the shoulder harness 30 which is drawn out to the outside of the body portion 42 is passed through the slot 34 of the seat back 22, and is latched to the hanger 36 on the back-face side of the seat back 22. Hereby, the attachment of the harness cover 16 and the shoulder pad 18 with respect to the shoulder harness 30 is completed.

Figure 12:
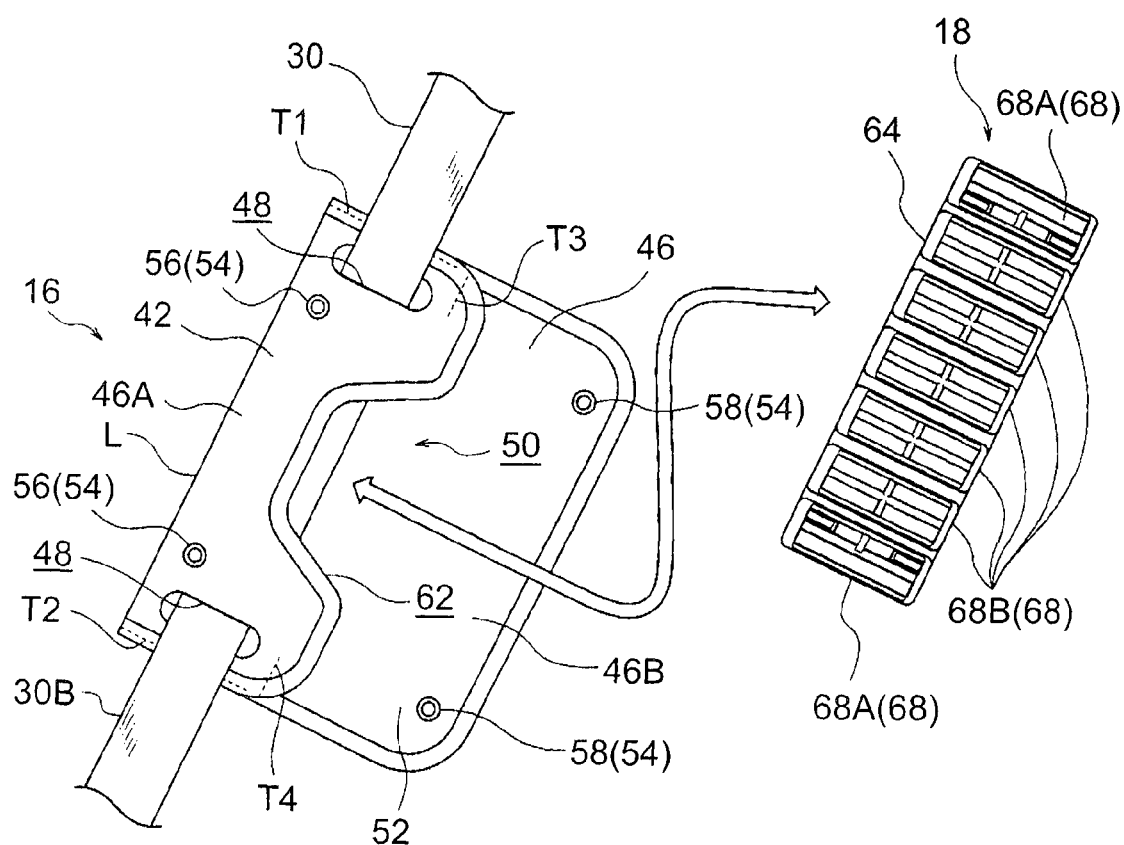
FIG. 12 is a perspective view to describe a state at the time when the shoulder pad is put in and out from the harness cover attached to the shoulder harness according to the embodiment of the invention.

Further, in the present embodiment, the harness cover 16 includes the opening 50 via which the shoulder pad 18 is put in and out. In view of this, as illustrated in FIG. 12, even in a state (hereinafter referred to as a cover attachment state) where the harness cover 16 is attached to the shoulder harness 30, it is possible to attach the shoulder pad 18 to and remove the shoulder pad 18 from the harness cover 16 and the shoulder harness 30.

For example, in the cover attachment state, in order to remove the shoulder pad 18 from the harness cover 16 and the shoulder harness 30, the door portion 52 of the harness cover 16 is initially opened so as to expose the opening 50 and the paired insertion holes 48. Subsequently, the restraint portion 30B of the shoulder harness 30 is drawn out from between the paired guide claws 84, so as to uncouple the shoulder pad 18 from the shoulder harness 30. Then, while the shoulder pad 18 is being slightly bent, the shoulder pad 18 is taken out from the opening 50 to outside of the harness cover 16.

In the meantime, in order to attach the shoulder pad 18 into the harness cover 16 in the cover attachment state, the shoulder pad 18 is inserted into the harness cover 16 via the opening 50 while the shoulder pad 18 is being slightly bent. Then, the restraint portion 30B of the shoulder harness 30 is inserted into between the paired guide claws 84, so as to hook, on the paired guide claws 84, both end portions of the restraint portion 30B in its width direction. Subsequently, the door portion 52 of the harness cover 16 is folded toward the body portion 42, and is latched to the body portion 42 by means of the paired snap buttons 54.

(Interactions and Effects)

The following describes interactions and effects of the present embodiment.

In the present embodiment, the shoulder harness 30 is passed through the paired insertion holes 48 formed in the harness cover 16, so that the harness cover 16 is attached to the shoulder harness 30. The harness cover 16 is formed in a pouch shape. The shoulder pad 18 accommodated inside the harness cover 16 is placed between the shoulder S of the occupant P and the shoulder harness 30. This makes it possible to effectively restrain the shoulder S of the occupant P at the time of a vehicle crash. As a result, it is possible to effectively limit a forward movement of the occupant P while relaxing a pressure on a chest of the occupant P.

Besides, the opening 50 is formed in the harness cover 16. This allows the shoulder pad 18 to be put in and out via the opening 50 in a state where the harness cover 16 is attached to the shoulder harness 30. Accordingly, it is possible to easily attach and remove the shoulder pad 18 according to a body frame of the occupant P or depending on whether the occupant P is a baby or an infant. For example, when a large shoulder pad 18 is set to a small infant, the infant may feel heavy and uncomfortable. In view of this, it is possible to make the following selection freely: the shoulder pad 18 is removed in an infant mode, while the shoulder pad 18 is attached in a baby mode. Further, the harness cover 16 and the shoulder pad 18 are provided as different members. In view of this, when a specification of the shoulder pad 18 is changed, it is not necessary to change the harness cover 16 as well. This makes it possible to achieve cost reduction.

Further, in the present embodiment, the opening 50 of the harness cover 16 is opened toward one side of the shoulder harness 30 in the width direction. This allows the shoulder pad 18 to be easily put in and out, in comparison with a case where the opening is opened toward one side of the shoulder harness 30 in the longitudinal direction.

Further, in the present embodiment, the shoulder pad 18 is accommodated in the body portion 42 that is formed in a pouch shape in the harness cover 16. The body portion 42 includes the paired insertion holes 48 through which the shoulder harness 30 is passed, and the opening 50 via which the shoulder pad 18 is put in and out. Further, the door portion 52 is extended from the edge portion of the opening 50. The door portion 52 is latched to the body portion 42 by means of the paired snap buttons 54 in a state where the door portion 52 is folded toward the body portion 42 and covers the opening 50 of the body portion 42 and the paired through holes 48. This makes it possible to inhibit the shoulder pad 18 accommodated inside the body portion 42 from being viewed from outside through the opening 50 and the paired insertion holes 48. As a result, it is possible to achieve good appearance. Further, it is also possible to inhibit the shoulder pad 18 from making contact with the occupant P, thereby making it possible to improve comfortability to the occupant P.

Further, in the present embodiment, the nonslip portion 60 is attached to that surface of the body portion 42 of the harness cover 16 which faces the shoulder S of the occupant P. The coefficient of surface friction the nonslip portion 60 is set to be higher than that of the body portion 42 of the harness cover 16. This makes it possible to inhibit careless displacement of the harness cover 16 and the shoulder pad 18 accommodated in the harness cover 16 with respect to the shoulder S of the occupant P.

Further, in the present embodiment, the opening 50 of the harness cover 16 is formed so as to be shorter than the shoulder pad 18. When the shoulder pad 18 is put in and out from the harness cover 16, the shoulder pad 18 is bent. That is, if the shoulder pad 18 is not bent, it is difficult for the shoulder pad 18 to be put in and out from the harness cover 16. This makes it possible to inhibit the shoulder pad 18 from falling off the harness cover 16 carelessly and to inhibit the shoulder pad 18 from being displaced carelessly with respect to the harness cover 16.

Further, in the present embodiment, the body portion 42 of the harness cover 16 includes the cutout portion 62 formed in the edge portion of the opening 50 toward a side opposite to the side where the door portion 52 is extended. This allows the shoulder pad 18 to be easily put in and out from the harness cover 16.

Further, in the present embodiment, the shoulder pad 18 includes the hold member 64 formed of a material having a flexibility, and the plurality of inserts 68 formed of a material that is harder than the hold member 64. The hold member 64 includes the tabular portion 70 that is elongated and is placed along the shoulder harness 30, and the plurality of inserts 68 is provided side by side in the longitudinal direction of the tabular portion 70. The plurality of inserts 68 is attached to that surface of the tabular portion 70 which faces the shoulder harness 30. Accordingly, the tabular portion 70 is placed between the plurality of inserts 68 and the shoulder S of the occupant P. This makes it possible to inhibit the occupant P from feeling uncomfortable due to rough texture of the plurality of inserts 68. Further, the hold member 64 is formed of a material having a flexibility. This allows those parts of the tabular portion 70 of the hold member 64 which are placed between the plurality of inserts 68 to function as hinges. This accordingly allows the tabular portion 70 to be fitted to the shoulder S of the occupant P successfully. As a result, it is possible to improve comfortability to the occupant P. Further, at the time of a vehicle crash, it is possible to support a load from the shoulder S of the occupant P successfully by the plurality of inserts 68 placed between the shoulder harness 30 and the tabular portion 70, and it is possible to ensure a pressure receiving area with respect to the shoulder S of the occupant P due to the tabular portion 70. This makes it possible to achieve a successful occupant restraint performance.

Further, in the present embodiment, the paired guide claws 84 provided on either end portion of the shoulder pad 18 in the longitudinal direction face respective end portions of the shoulder harness 30 in the width direction from a side opposite to the occupant P. This allows both end portions of the shoulder pad 18 in the longitudinal direction to be connected to the shoulder harness 30. As a result, it is possible to inhibit careless displacement of the shoulder pad 18 with respect to the shoulder harness 30. In addition, when the shoulder pad 18 is put in and out from the harness cover 16, the restraint portion 30B of the shoulder harness 30 (the intermediate part thereof in the longitudinal direction) is able to be put in and out from between the paired guide claws 84. Accordingly, it is possible to easily attach and remove the shoulder pad 18.

Supplementary Description of Embodiment

In the above embodiment, the shoulder pad 18 is configured to be connected to the shoulder harness 30 by the paired guide claws 84. The invention is not limited to this, and may be configured such that the paired guide claws 84 are omitted.

Further, in the above embodiment, the shoulder pad 18 is configured to include the rubber hold member 64, and the plurality of resin inserts 68 (hard members) attached to the hold member 64. The invention is not limited to this, and the configuration of the shoulder pad can be modified appropriately. For example, the shoulder pad may be configured to be entirely formed of rubber.

Further, in the above embodiment, the cutout portion 62 is formed in the body portion 42 of the harness cover 16. The invention is not limited to this, and may be configured such that the cutout portion is not formed in the body portion.

Further, in the above embodiment, the opening 50 of the harness cover 16 is formed so as to be shorter than the shoulder pad 18. The invention is not limited to this, and may be configured such that the opening of the harness cover is formed so as to be longer than the shoulder pad or may be configured such that the opening of the harness cover is formed so as to have the same length as the shoulder pad.

Further, in the above embodiment, the harness cover 16 is configured to include the nonslip portion 60. The invention is not limited to this, and may be configured such that the nonslip portion 60 is omitted.

Further, in the above embodiment, the harness cover 16 is configured to include the door portion 52 and the snap buttons 54 (the door latch portion). The invention is not limited to this, and may be configured such that the harness cover is not provided with the door portion and the door latch portion, and the opening of the body portion is opened and closed by means of a fastener or the like.

Further, in the above embodiment, the opening 50 of the harness cover 16 is configured to be opened in the width direction of the shoulder harness 30. The invention is not limited to this, and may be configured such that the opening of the harness cover is opened in the longitudinal direction of the shoulder harness.

In addition, the invention can be performed with various modifications without departing from a gist of the invention. Further, it is needless to say that a scope of the invention is not limited to the above embodiment.

What is claimed is:
1. A vehicle child safety seat comprising:
   a seat main body on which an occupant sits;
   a seat belt for restraining the occupant to the seat main body, the seat belt including a shoulder harness having a long belt shape and facing a shoulder of the occupant;
   a shoulder pad placed between the shoulder of the occupant and the shoulder harness; and
   a harness cover formed in a pouch shape, having paired insertion holes through which the shoulder harness is passed so that the harness cover is attached to the shoulder harness, accommodating the shoulder pad therein, and having an opening so that the shoulder pad is put in and out via the opening in a state where the harness cover is attached to the shoulder harness,
   wherein a body portion of the harness cover includes a cutout portion.
2. The vehicle child safety seat according to claim 1, wherein the opening is opened in a width direction of the shoulder harness.
3. The vehicle child safety seat according to claim 1, wherein
   the harness cover includes: the body portion formed in a pouch shape so as to accommodate the shoulder pad therein and having the paired insertion holes and the opening; a door portion extended from an edge portion of the opening in the body portion and folded toward the body portion so as to cover the opening; and a door latch portion for latching, to the body portion, the door portion thus folded toward the body portion.

4. The vehicle child safety seat according to claim 1, wherein
the harness cover includes: the body portion formed in a pouch shape so as to accommodate the shoulder pad therein and having the paired insertion holes and the opening; and a nonslip portion attached to that surface of the body portion which faces the shoulder of the occupant and having that coefficient of surface friction which is set to be higher than that of the body portion.

5. The vehicle child safety seat according to claim 3, wherein
the harness cover includes a nonslip portion attached to that surface of the body portion which faces the shoulder of the occupant and having that coefficient of surface friction which is set to be higher than that of the body portion.

6. The vehicle child safety seat according to claim 1, wherein the opening of the harness cover has a linear dimension that is shorter than a length of the shoulder pad, such that when the shoulder pad is put in and out from the harness cover, the shoulder pad is bent.

7. The vehicle child safety seat according to claim 3, wherein
the cutout portion is formed in the edge portion of the opening toward a side opposite to a side where the door portion is extended.

8. The vehicle child safety seat according to claim 1, wherein the shoulder pad includes: a hold member formed of a material having a flexibility, and including an elongated tabular portion placed along the shoulder harness; and a plurality of hard members each formed of a material that is harder than the hold member, the plurality of hard members being attached to that surface of the tabular portion which faces the shoulder harness, with intervals therebetween in a longitudinal direction of the tabular portion.

9. The vehicle child safety seat according to claim 1, wherein
the shoulder pad is formed in an elongated shape along a longitudinal direction of the shoulder harness, and paired guide claws facing respective end portions of the shoulder harness in its width direction from a side opposite to the shoulder of the occupant are provided on either end portion of the shoulder pad in its longitudinal direction.

10. The vehicle child safety seat according to claim 1, wherein two harness covers are provided so as to make contact with right and left shoulders of the occupant;
the two harness covers are connected to each other via a strap; and
the strap is connected to the seat main body.

11. The vehicle child safety seat according to claim 3, wherein
the door portion covers the opening and the insertion holes.

12. A harness cover comprising:
a body portion formed in a pouch shape, having paired insertion holes through which a shoulder harness provided in a seat belt for restraining an occupant sitting on a vehicle child safety seat is passed so that the body portion is attached to the shoulder harness, accommodating a shoulder pad therein, and having an opening so that the shoulder pad is put in and out via the opening in a state where the body portion is attached to the shoulder harness, wherein the body portion includes a cutout portion;
a door portion extended from an edge portion of the opening in the body portion and folded toward the body portion so as to cover the opening; and
a door latch portion for latching, to the body portion, the door portion folded toward the body portion.

13. The harness cover according to claim 12, further comprising:
a strap attached to the body portion and connecting the harness cover to another harness cover.

14. The harness cover according to claim 12, wherein the door portion covers the opening and the insertion holes.

* * * * *

UNITED STATES PATENT AND TRADEMARK OFFICE
CERTIFICATE OF CORRECTION

PATENT NO. : 9,610,866 B2
APPLICATION NO. : 14/648118
DATED : April 4, 2017
INVENTOR(S) : Tetsu Mitsuo et al.

It is certified that error appears in the above-identified patent and that said Letters Patent is hereby corrected as shown below:

On the Title Page

In item (73), please add: --TAKATA CORPORATION, TOKYO, JAPAN-- as the second Assignee.

Signed and Sealed this
Third Day of October, 2017

Joseph Matal
*Performing the Functions and Duties of the*
*Under Secretary of Commerce for Intellectual Property and*
*Director of the United States Patent and Trademark Office*